(12) United States Patent
Su

(10) Patent No.: US 7,414,837 B2
(45) Date of Patent: Aug. 19, 2008

(54) ATCA BOARD COMPATIBLE HARD DISK MOUNTING STRUCTURE

(75) Inventor: Feng-Qing Su, Taipei (TW)

(73) Assignee: Adlink Technology Inc., Taipei Hsien (TW)

( * ) Notice: Subject to any disclaimer, the term of this patent is extended or adjusted under 35 U.S.C. 154(b) by 421 days.

(21) Appl. No.: 11/163,857

(22) Filed: Nov. 1, 2005

(65) Prior Publication Data

US 2007/0097616 A1    May 3, 2007

(51) Int. Cl.
*G06F 1/20*    (2006.01)
*G06F 1/16*    (2006.01)

(52) U.S. Cl. .................. 361/687; 361/685; 361/695

(58) Field of Classification Search .......... 361/685, 361/687, 695; 415/206
See application file for complete search history.

(56) References Cited

U.S. PATENT DOCUMENTS

| | | | |
|---|---|---|---|
| 6,222,727 B1* | 4/2001 | Wu | 361/685 |
| 6,262,883 B1* | 7/2001 | Kim | 361/680 |
| 6,392,884 B1* | 5/2002 | Chou | 361/687 |
| 6,560,099 B1* | 5/2003 | Chang | 361/685 |
| 6,621,693 B1* | 9/2003 | Potter et al. | 361/685 |
| 6,762,932 B2* | 7/2004 | Regimbal et al. | 361/683 |
| 6,954,940 B2* | 10/2005 | Hsu | 720/639 |
| 7,242,580 B1* | 7/2007 | Tanaka | 361/696 |
| 2002/0054475 A1* | 5/2002 | Boss et al. | 361/685 |
| 2002/0181196 A1* | 12/2002 | Sivertsen et al. | 361/685 |

* cited by examiner

*Primary Examiner*—Jayprakash N Gandhi
*Assistant Examiner*—Zachary M Pape

(57) ABSTRACT

An ATCA board compatible hard disk mounting structure is disclosed to include a cover fastened to an ATCA board to hold a hard disk, a bracket fixedly fastened to the front side of the cover, a plurality of electric fans mounted in the bracket, an insulative member mounted in between the cover and the bracket to isolate the cover from the bracket, and a face panel fastened to the bracket and fitted into one PMC slot of an I/O face panel of the ATCA board.

7 Claims, 6 Drawing Sheets

ATCA BOARD COMPATIBLE HARD DISK MOUNTING STRUCTURE

BACKGROUND OF THE INVENTION

1. Field of the Invention

The present invention relates to a hard disk mounting structure and more particularly, to a ATCA board compatible hard disk mounting structure, which fits one PMC slot of the ATCA (advanced TCA) board, isolate the hard disk from hot air in the machine case, enhances circulation of air to dissipate heat from the hard disk efficiently, and provides regular grounding and digital grounding effects.

2. Description of the Related Art

Currently, many enterprises install relatively cheaper mini servers to satisfy network traffic requirements. In order to improve further economic effect, blade servers are developed. A blade server is a thin, modular electronic board, containing at least one microprocessor and memory, which is intended for a single, dedicated application and that can be easily inserted into a rack with many similar servers.

A blade server machine case can accommodate several tends of blade servers or more, and blade server is equivalent to a regular server. These blade servers share the same resources such as server machine case, display, keyboard and power supply unit, achieving easy connection to the big scale data center. Further, the server machine case has installed therein an intelligent system that provides internal resource-related information. The intelligent system can discriminate webbed blade server resources, specific tasks, or application software run on the blade servers, allowing flexible application of every blade server in the server machine case. The most attractive advantage of a blade server is its high reliability and extendibility because every blade server has the backup function. The hot plugging of the server machine case that supports blade servers and system component parts provides high applicability. When one blade servers failed, another blade server can take the place without interrupting the service. When wishing to increase the handling power, it needs only to insert more blade servers and to arrange these resources at the place where the demand is most strong.

In order to satisfy the demand of next generation communication equipment and the market demand for high traffic data bandwidth, server blades follow the modular design of Compact PCI specifications. The structural design includes the definition of the server machine case, the main board, the back board, the dimensions of the rear I/O extension board, the height limitation, the connector used, the front panel, the hot plugging handle, and etc. According to this new definition, the 8U long space of the front face panel is sufficient for accommodating four standard PMC slots and four standard LED displays and can support the hot plugging function of the main board when used with a specific handle. However, a PMC module's user must accurately know the transmission mode, interconnection between V I/O and rear I/O, and the compatibility of the supported bus arbitration to the carrier board. Further, the power demand for the interface of relatively higher speed and the expansion of next generation silicon circuit requires a change of PMC's specification. These drawbacks impart a barrier to the use of PMC module. Further, a blade server defines the hard disk to be a part of digital ground. Further, when a hard disk is installed in a blade server, it is exposed to the outside and not well protected. This arrangement does not provided an environment for quick dissipation of heat from the hard disk. In a blade server architecture, the hard disk cannot be set in the most proper location to save the server case space effectively.

Therefore, it is desirable to provide an ATCA board compatible hard disk mounting structure that saves and fully utilizes space, protects the hard disk against hot air produced by the dual CPU cooler module in the server machine case, and provides the hard disk with an efficient cooling environment.

SUMMARY OF THE INVENTION

The present invention has been accomplished under the circumstances in view. According to one aspect of the present invention, the ATCA board compatible hard disk mounting structure comprises a cover fastened to an ATCA board to hold a hard disk, a bracket fixedly fastened to the front side of the cover, a plurality of electric fans mounted in the bracket, an insulative member mounted in between the cover and the bracket to isolate the cover from the bracket, and a face panel fastened to the bracket and fitted into one PMC slot of an I/O face panel of the ATCA board. The ATCA board compatible hard disk mounting structure utilizes the cover for digital grounding. Further, the bracket holds the face panel in the PMC slot at the I/O face panel of the ATCA board to provide regular grounding. Further, because the insulative member is set between the cover and the bracket to isolate the cover from the bracket, the ATCA board compatible hard disk mounting structure provides both the function of regular grounding and the function of digital grounding.

According to another aspect of the present invention, the ATCA board compatible hard disk mounting structure utilizes the cover to isolate the hard disk from the hot air produced by the dual CPU cooler module in the machine case, preventing temperature increasing of the hard disk, and utilizes the electric fans to suck outside cooling air into the inside of the cover toward the ventilation port to enhance circulation of air through the ATCA board compatible hard disk mounting structure and to further lower the temperature of the hard disk.

According to still another aspect of the present invention, the face panel of the ATCA board compatible hard disk mounting structure is fitted into one PMC slot of the I/O face panel of the ATCA board and then the whole assembly of the ATCA board compatible hard disk mounting structure is affixed to the ATCA board with fastening members, therefore, the invention saves and fully utilizes space.

DETAILED DESCRIPTION OF THE PREFERRED EMBODIMENT

Figure 1:
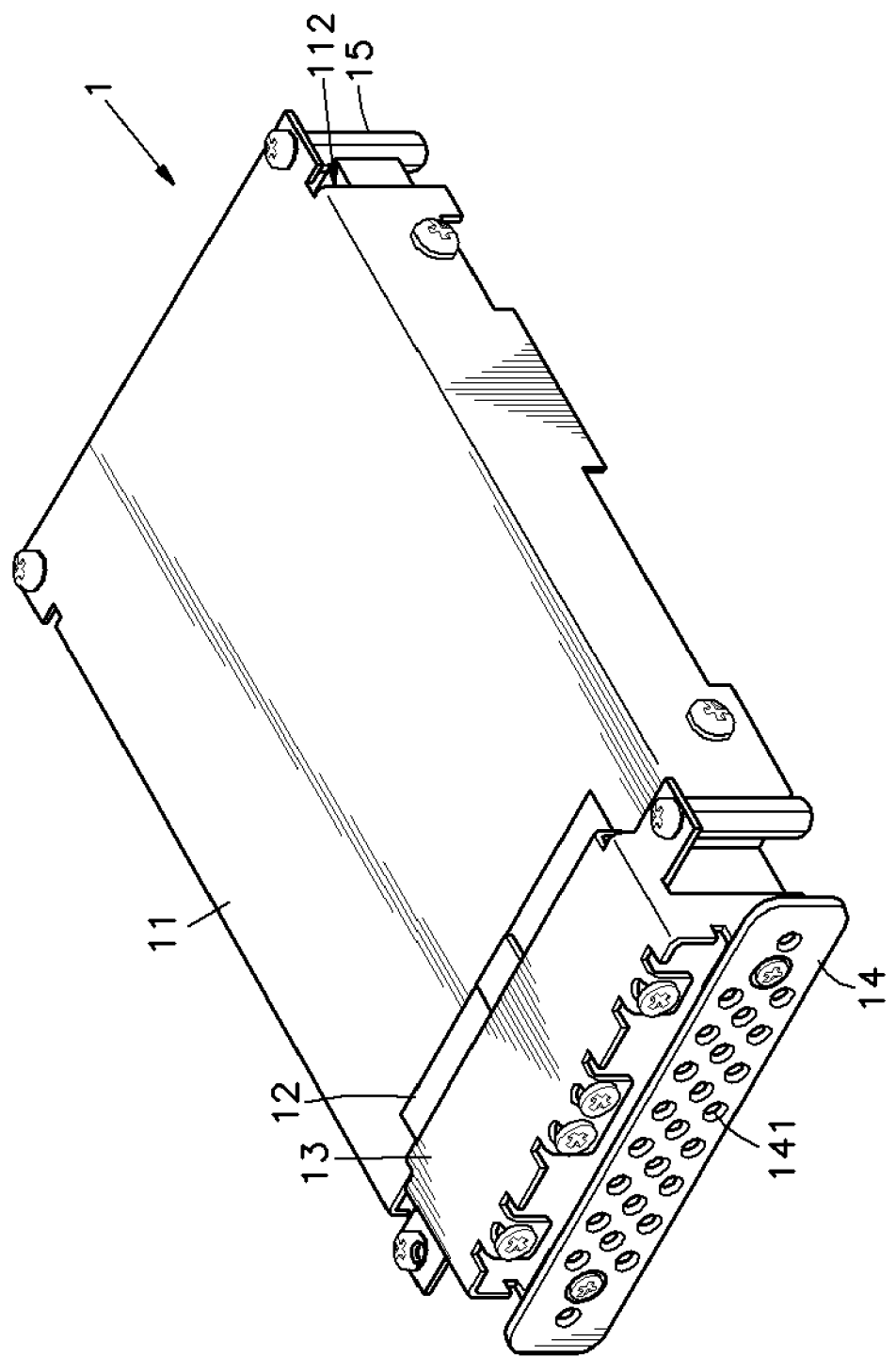
FIG. 1 is an elevational view showing the outer appearance of an ATCA board compatible hard disk mounting structure according to the present invention.
Figure 2:
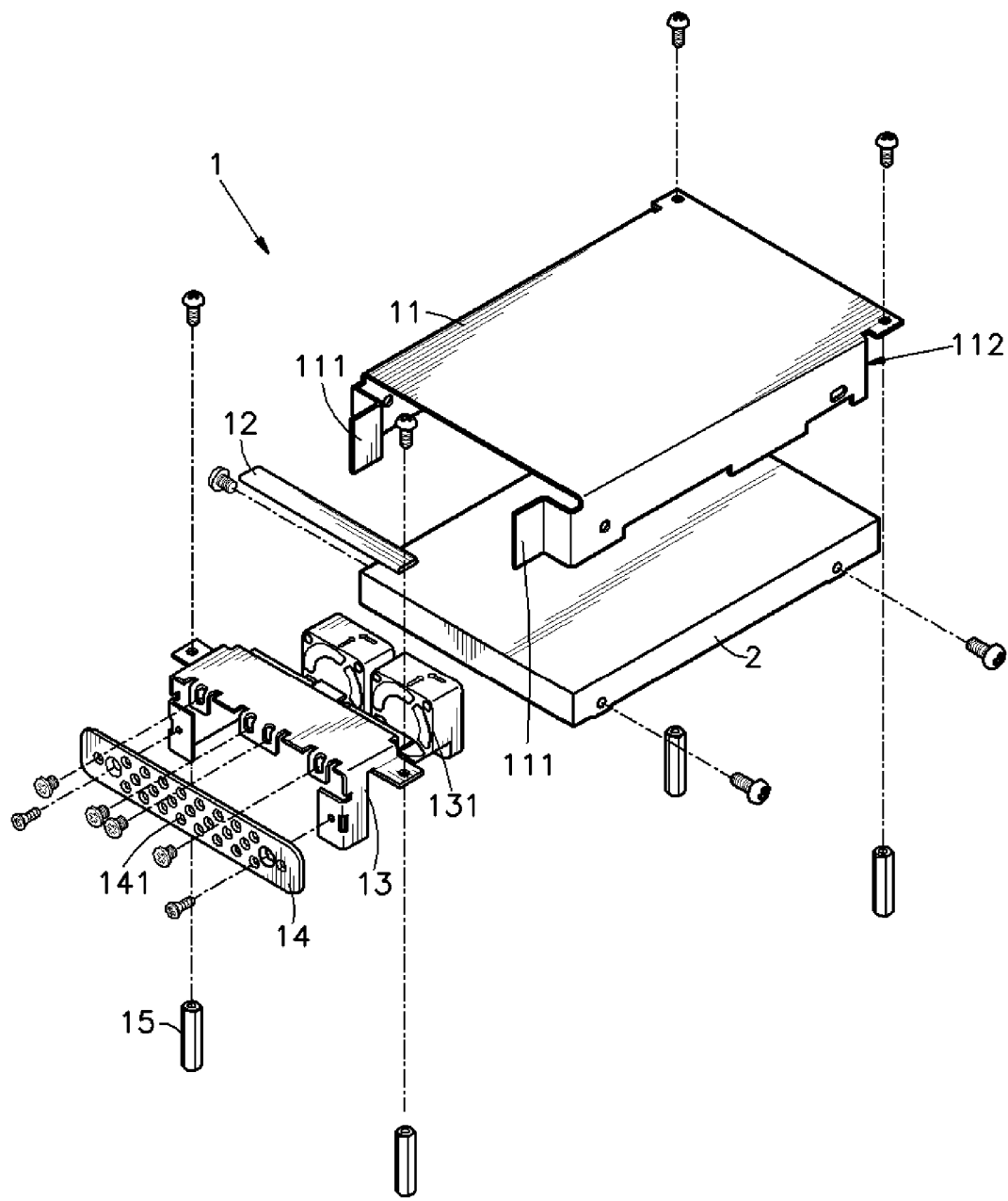
FIG. 2 is an exploded view of the ATCA board compatible hard disk mounting structure according to the present invention.

Referring to FIGS. 1 and 2, an ATCA (advanced TCA) board compatible hard disk mounting structure 1 in accordance with the present invention is shown comprising a cover 11, an insulative member 12, a bracket 13, and a face panel 14.

The cover 11 is a substantially U-shaped plate member adapted to accommodate a hard disk 2, having two curved clamping arms 111 respectively extending from two opposite vertical sidewalls thereof and continuously bent inwards and then outwards, and a rear ventilation port 112. The insulative member 12 is bonded to the top surface of the cover 11 and extending along the front side edge of the cover 11. The bracket 13 is attached to the top side of the insulative member 12 and fixedly secured to the front side of the cover 11 to hold a plurality of electric fans 131, keeping the electric fans 131 clamped by the two curved clamping arms 111 of the cover 11. The face panel 14 is fastened to the front side of the bracket 13 remote from the insulative member 12, having a plurality of through holes 141 for ventilation. The ATCA board compatible hard disk mounting structure 1 further comprises a plurality of hexagonal copper mounting posts 15 respectively provided at the cover 11 and the bracket 13 at the bottom side for mounting.

The face panel 14 can be fastened to the bracket 13 by any of a variety of mounting techniques, for example, screws.

Figure 6:
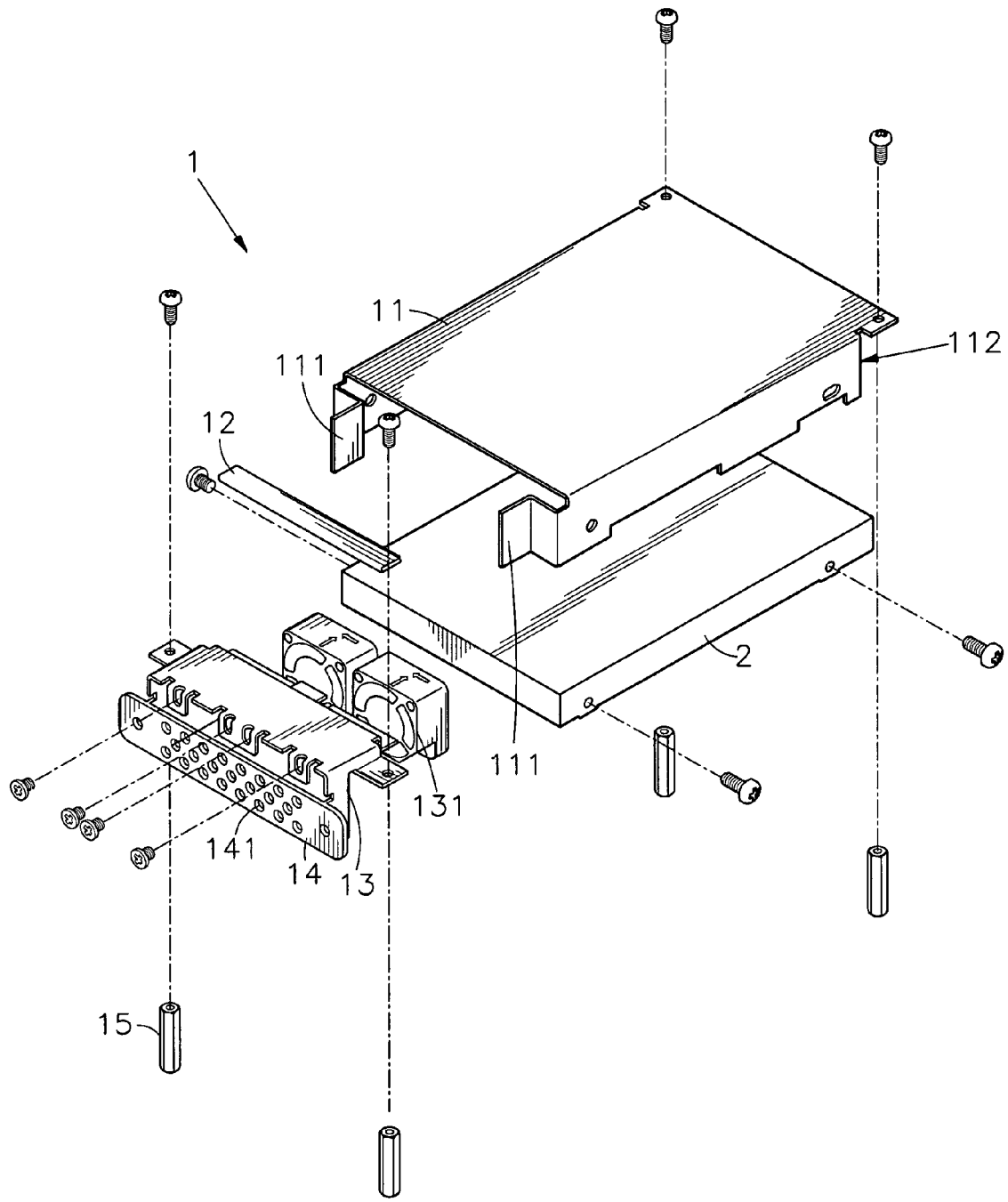
FIG. 6 is an exploded view of the ATCA board compatible hard disk mounting structure according to another embodiment of the present invention.

According to this embodiment, the bracket 13 and the face panel 14 are two independent member detachably fastened together. Alternatively, as shown in FIG. 6, the bracket 13 can be integrally formed with the face panel 14.

Figure 3:
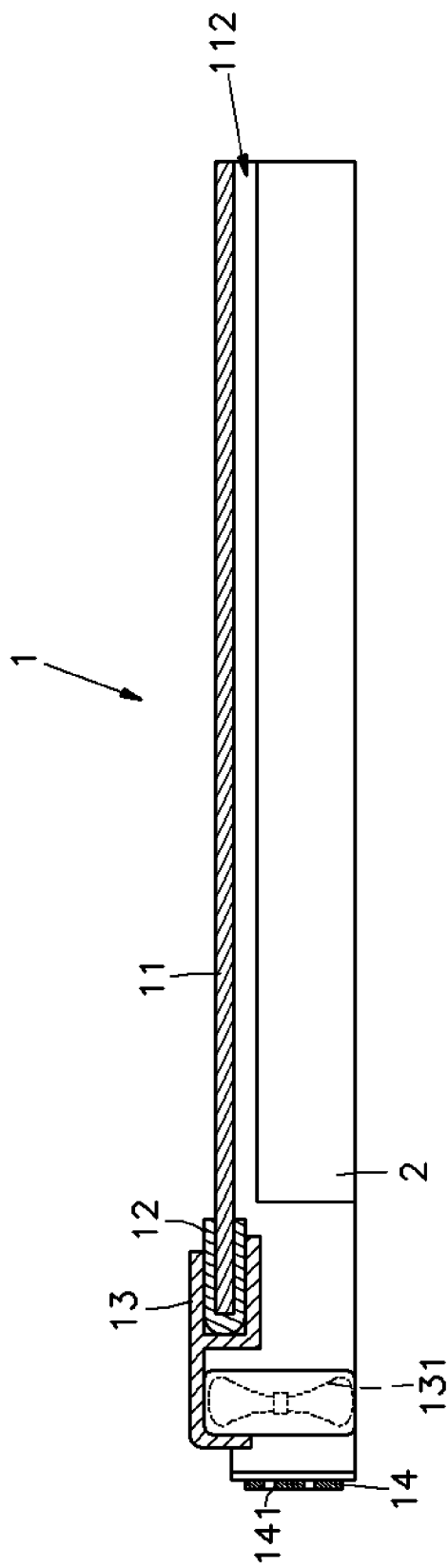
FIG. 3 is a sectional side view of the ATCA board compatible hard disk mounting structure according to the present invention.

Referring to FIG. 3 and FIGS. 1 and 2 again, the ATCA board compatible hard disk mounting structure 1 utilizes the cover 11 to isolate the hard disk 2 from the hot air produced by the dual CPU cooler module in the machine case, preventing temperature increasing of the hard disk 2. Further, the ATCA board compatible hard disk mounting structure 1 utilizes the electric fans 131 to suck outside cooling air into the inside of the cover 11 toward the ventilation port 112 to enhance circulation of air through the ATCA board compatible hard disk mounting structure 1 and to further lower the temperature of the hard disk 2. Further, the cover 11 prohibits direct impact of an external object against the hard disk 2 accidentally when plugging a device into an ATCA board 3 or unplugging a device from the ATCA board 3.

Figure 4:
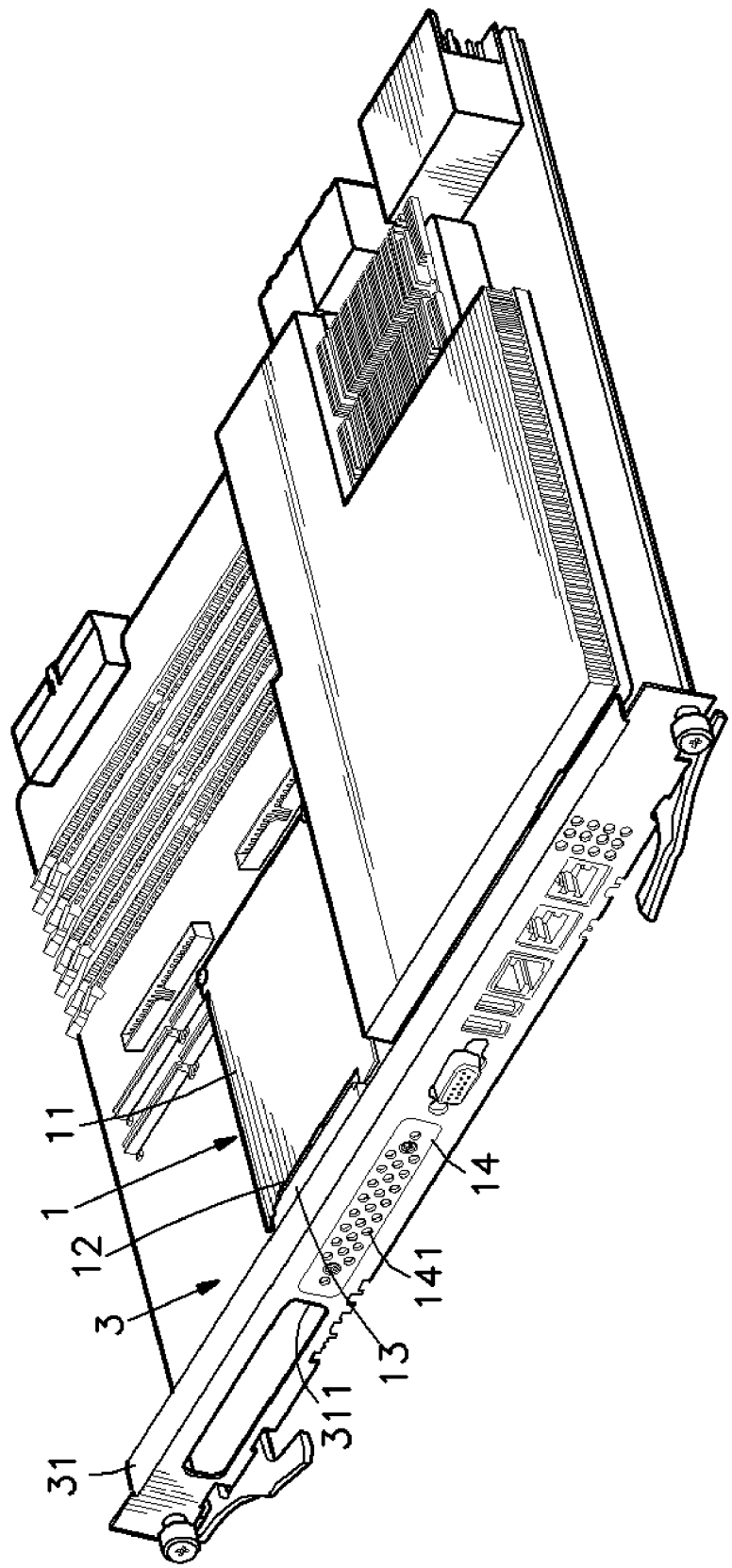
FIG. 4 is an applied view of the present invention showing the ATCA board compatible hard disk mounting structure installed in an ATCA board.

Referring to FIG. 4 and FIGS. 2 and 3 again, the cover 11 of the ATCA board compatible hard disk mounting structure 1 allows digital grounding. The face panel 14 at the bracket 13 of the ATCA board compatible hard disk mounting structure 1 is fitted into one PMC slot 311 at an I/O face panel 31 of the ATCA board 3, achieving regular grounding of the hard disk 2 in the ATCA board compatible hard disk mounting structure 1. Further, the insulative member 12 is set between the cover 11 and the bracket 13 to isolate the bracket 13 from the cover 11, therefore the ATCA board compatible hard disk mounting structure 1 provides regular grounding and digital grounding functions.

The aforesaid insulative member 12 works an isolation member that prevents direct contact between the cover 11 and the bracket 13. The insulative member 12 can be made of polyester film, plastic or rubber pad, or any of a variety of insulative materials.

Figure 5:
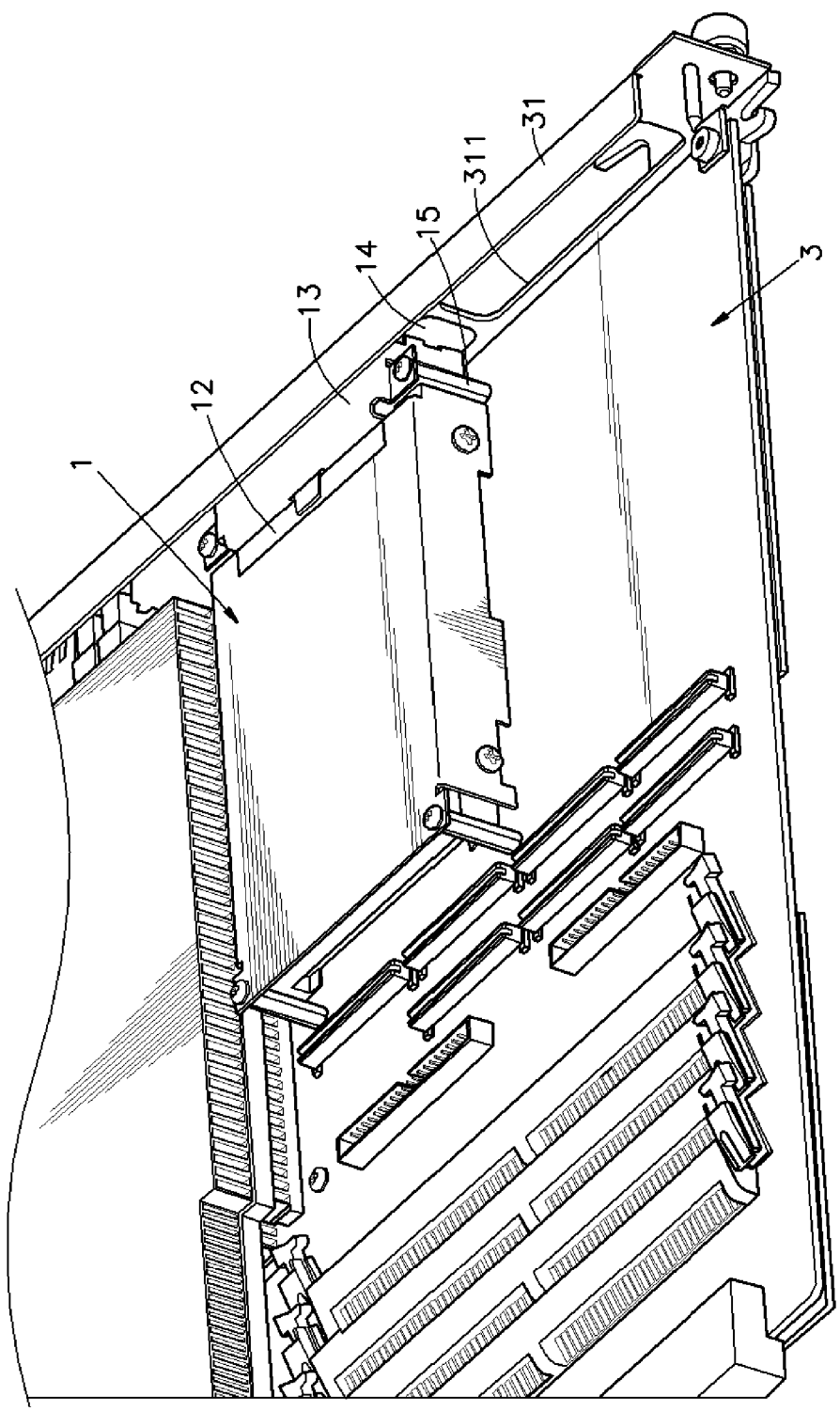
FIG. 5 is an enlarged view of a part of FIG. 4 when viewed from another angle.

Referring to FIG. 5 and FIGS. 3 and 4 again, when in use, the face panel 14 of the ATCA board compatible hard disk mounting structure 1 is fitted into one PMC slot 311 at the I/O face panel 31 of the ATCA board 3 and then affixed to the ATCA board 3 with the hexagonal copper mounting posts 15 and screws. This installation design saves and filly utilizes the space of the ATCA board 3.

In the aforesaid embodiment, the hexagonal copper mounting posts 15 are used with screws to affix the ATCA board compatible hard disk mounting structure 1 to the ATCA board 3. Alternatively, the hexagonal copper mounting posts 15 can be omitted, and screws can be used to affix the ATCA board compatible hard disk mounting structure 1 to the ATCA board 3 directly.

As indicated above, the invention provides an ATCA board compatible hard disk mounting structure, which has the following characteristics.

1. The ATCA board compatible hard disk mounting structure 1 utilizes the cover 11 to isolate the hard disk 2 from the hot air produced by the dual CPU cooler module in the machine case, preventing temperature increasing of the hard disk 2, and utilizes the electric fans 131 to suck outside cooling air into the inside of the cover 11 toward the ventilation port 112 to enhance circulation of air through the ATCA board compatible hard disk mounting structure 1 and to further lower the temperature of the hard disk 2.

2. The invention uses the cover 11 to accommodate the hard disk 2, prohibiting direct impact of an external object against the hard disk 2 accidentally when plugging a device into the ATCA board 3 or unplugging a device from the ATCA board 3.

3. The invention utilizes the cover 11 for digital grounding. Further, the bracket 13 holds the face panel 14 in the PMC slot 311 at the I/O face panel 31 of the ATCA board 3 to provide regular grounding. Further, because the insulative member 12 is set between the cover 11 and the bracket 13 to isolate the cover 11 from the bracket 13, the ATCA board compatible hard disk mounting structure 1 provides the function of regular grounding as well as the function of digital grounding.

4. Because the face panel 14 of the ATCA board compatible hard disk mounting structure 1 is fitted into one PMC slot 311 at the 110 face panel 31 of the ATCA board 3 and then the whole assembly of the ATCA board compatible hard disk mounting structure 1 is affixed to the ATCA board 3 with the hexagonal copper mounting posts 15 and/or screws, the invention saves space occupation and fully utilizes the space of the ATCA board 3.

A prototype of ATCA board compatible hard disk mounting structure has been constructed with the features of FIGS. 1~6. The ATCA board compatible hard disk mounting structure functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An ATCA board compatible hard disk mounting structure comprising a cover fastened to an ATCA board to hold a hard disk, where the ATCA board compatible hard disk mounting structure further comprises a bracket fixedly fastened to a front side of said cover, a plurality of electric fans mounted in said bracket, an insulative member mounted in between said cover and said bracket to isolate said cover from said bracket, and a face panel fastened to said bracket and fitted into one PMC slot of an I/O face panel of said ATCA board.

2. The ATCA board compatible hard disk mounting structure as claimed in claim 1, wherein said cover comprises two curved clamping arms symmetrically disposed at two opposite lateral sides and respectively clamped on said electric fans in said bracket.

3. The ATCA board compatible hard disk mounting structure as claimed in claim 1, wherein said face panel comprises a plurality of through holes for ventilation.

4. The ATCA board compatible hard disk mounting structure as claimed in claim 1, wherein said face panel is formed integral with said bracket.

5. The ATCA board compatible hard disk mounting structure as claimed in claim 1, further comprising positioning means for positioning on said ATCA board.

6. The ATCA board compatible hard disk mounting structure as claimed in claim 5, wherein said positioning means comprises a plurality of hexagonal copper mounting posts.

7. The ATCA board compatible hard disk mounting structure as claimed in claim 5, wherein said positioning means comprises a plurality of screws.

\* \* \* \* \*